(12) United States Patent
Hernandez-Valencia

(10) Patent No.: US 6,480,467 B1
(45) Date of Patent: Nov. 12, 2002

(54) CONFORMANCE DEFINITIONS FOR GUARANTEED FRAME RATE SERVICE

(75) Inventor: Enrique Hernandez-Valencia, Highlands, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/045,350

(22) Filed: Mar. 20, 1998

(51) Int. Cl.[7] .............................................. H04L 12/43
(52) U.S. Cl. ...................................... 370/230; 370/241
(58) Field of Search ................................. 370/241, 230, 370/235, 236, 234, 252, 258, 396–402

(56) References Cited

U.S. PATENT DOCUMENTS 5,666,353 A * 9/1997 Klausmeier et al. ........ 370/230
5,864,540 A * 1/1999 Bonomi et al. ............. 370/235
6,266,327 B1 * 7/2001 Hernandez-Valencia .... 370/252

OTHER PUBLICATIONS

Fabrice Guillemin et al., "Cell conformance testing with respect to the peak cell rate in ATM networks" Computer Networks and ISDN Systems, vol. 27, Issue: 5, pp. 703–725, Mar. 1995.*
The ATM Forum Technical Committee, Traffic Management Specification, Version 4.0, Apr. 1996.*
Rohit Goyal, "Simulation Experiments with Guaranteed Frame Rate for TCP/IP Traffic", ATM Forum Technical Working Group, pp. 2–12, Jul. 1997.*

* cited by examiner

Primary Examiner—Kwang Bin Yao
Assistant Examiner—Prenell Jones
(74) Attorney, Agent, or Firm—Joseph J. Opalach; Matthew J. Hodulik

(57) ABSTRACT

An ATM network element receives a stream of data associated with a particular user. This data stream is further partitioned into frames and ATM cells. A predefined traffic set is associated with the user. The ATM network element evaluates the received data stream for conformance to the user's traffic set at every frame boundary. If a particular frame is conforming, the ATM network element provides a predefined quality of service (QoS) to the user. If a particular frame is non-conforming (and hence there is no commitment to the user of the corresponding QoS), the next (future) frame is evaluated only on the basis of the traffic characteristics of past conforming frames and the future frame. That is, past non-conforming user generated traffic is not used to determine any QoS commitments to future user generated traffic.

10 Claims, 7 Drawing Sheets

CONFORMANCE DEFINITIONS FOR GUARANTEED FRAME RATE SERVICE

CROSS-REFERENCE TO RELATED APPLICATIONS

Related subject matter is disclosed in the co-pending, commonly assigned, U.S. Patent application of Hernandez-Valencia, entitled "A Non-Conformance Indicator for the Guaranteed Frame Rate Service," serial No. XX, filed on even date herewith.

FIELD OF THE INVENTION

This invention relates generally to communications and, more particularly, to a packet communications system.

BACKGROUND OF THE INVENTION

Existing ATM (Asynchronous Transfer Mode) services are mainly geared towards native cell-based applications, at least in regard to their Quality of Service (QoS) commitments. In contrast, the Guaranteed Frame Rate service (GFR) is a new proposed Service Category in the ATM Forum, or ATM Transfer Capability (ATC) in ITUT-T, that is a specialized cell transport mechanism for packet-based. or frame-based applications (e.g., see ITU-T Recommendation I.371 Living List: Perth, Australia, Rapporteur Meeting, 1998). Generally speaking, the GFR service is expected to deliver a minimum bandwidth guarantee to a user with respect to the user's frame traffic that conforms to a set of predefined conditions (also referred to herein as a traffic set, or traffic descriptors). (This minimum bandwidth guarantee, typically expressed in terms of a low cell loss, is also referred to herein as one example of a GFR QoS commitment). The minimum bandwidth guarantee can be determined at subscription time, or negotiated during call setup.

GFR is intended to support non-real time applications. Higher-layer protocol data units (PDUs), or frames, are segmented into one or more user-generated cells prior to their transmission over the standardized network interface. Multiple frames are not expected to straddle a single ATM cell nor are cells from multiple frames expected to be interleaved unless a suitable de-multiplexing mechanism is provided (e.g., the MID (message identification) field in ATM Adaptation Layer (AAL) ¾ or a Virtual Path Identifier (VPI)IVirtual Connection Identifier (VCI) fields in other AALs (e.g., see ITU-T Recommendation I.363.3 BISDN ATM Adaptation Layer Specification (AAL ¾), 1996)). In addition, a mechanism to identify frame boundaries at the ATM layer is required (e.g., the User-to-User Indication (UUI) bit in AAL5). Although, theoretically, a GFR service may be implemented with any AAL providing a frame delineation mechanisms, the initial implementation of the GFR service is geared towards the use of AAL5.

As part of providing the GFR service, a conformance algorithm is used to identify that portion of the user generated traffic that meets the requirements of the abovementioned traffic set. Illustratively, the traffic set includes a set of parameters such as (but not limited to): peak cell rate (PCR) (instantaneous cell rate); minimum cell rate (MCR) (a maximum number of cells over a period of time, T, to which a QoS commitment applies); maximum burst size (MBS) (which can be interpreted as the maximum number of cells allowed in a data burst at rate PCR); and a maximum frame size (MFS) (a maximum number of cells permitted in a frame). The conformance algorithm evaluates, in real time, a received data stream from a user against the user's predefined traffic set, where the received data stream is partitioned into frames that are further made up of ATM cells.

This is shown in FIG. 1. An illustrative received data stream comprises data burst 51, occurring over a time interval T. Each data burst comprises a plurality of cells. The cells are further partitioned into frames 61 and 62 (denoted by the dashed boxes). The conformance algorithm measures the above described PCR, MCR, MBS, and MFS values for this received data stream. For example, assume that the permitted MFS value of the traffic set is equal to 6 (it should be noted that these numbers are used for illustrative purposes only). The conformance algorithm counts each received cell for frame 61. Upon reaching the seventh cell, the conformance algorithm declares frame 61 to be in non-conformance, and, as such, frame 61 does not received the committed QoS. (It should be noted that frame 61, albeit non-conforming, may still be transmitted by the network.) In the context of frame 61, the first six cells from frame 61 are referred to conforming and the two excess cells 71 are referred to as non-conforming. However, even though frame 61 has been declared non-conforming with respect to the MFS, those six conforming cells from frame 61 are still used in determining conformance to the other traffic set parameters. In particular, the six conforming cells from frame 61 are used to determine whether data burst 51 conforms to the MBS. Illustratively, assume that the MBS is equal to a value of 10 cells. In this instance, data burst 51 is non-conforming since frame 62 comprises six cells, which when added to the six conforming cells from frame 61 exceeds the MBS requirement. As such, frame 62 is also declared as non-conforming notwithstanding the fact that frame 62 meets the MFS requirement. As such, in this conformance technique, cells from a prior non-conforming frame are also applied to the next frame for use in determining if that (future) frame can receive the committed QOS.

SUMMARY OF THE INVENTION

Unfortunately, I have observed that the above-described conformance algorithm approach can somewhat degrade the value of a GFR service to a user since past non-conforming user generated traffic can negate any QoS commitments to future user generated traffic. Therefore, and in accordance with the invention, a QoS commitment for a frame is determined only on the basis of cells within that frame and past conforming frames.

In an illustrative embodiment, an ATM network element receives a stream of data associated with a particular user. This data stream is further partitioned into frames and ATM cells. A predefined traffic set is associated with the user. The ATM network element evaluates the received data stream for conformance to the user's traffic set at every frame boundary. If a particular frame is non-conforming, the next (future) frame is evaluated only on the basis of the traffic characteristics of past conforming frames and the future frame. That is, past non-conforming user generated traffic is not used to determine any QoS commitments to future user generated traffic.

DETAILED DESCRIPTION

Figure 1:
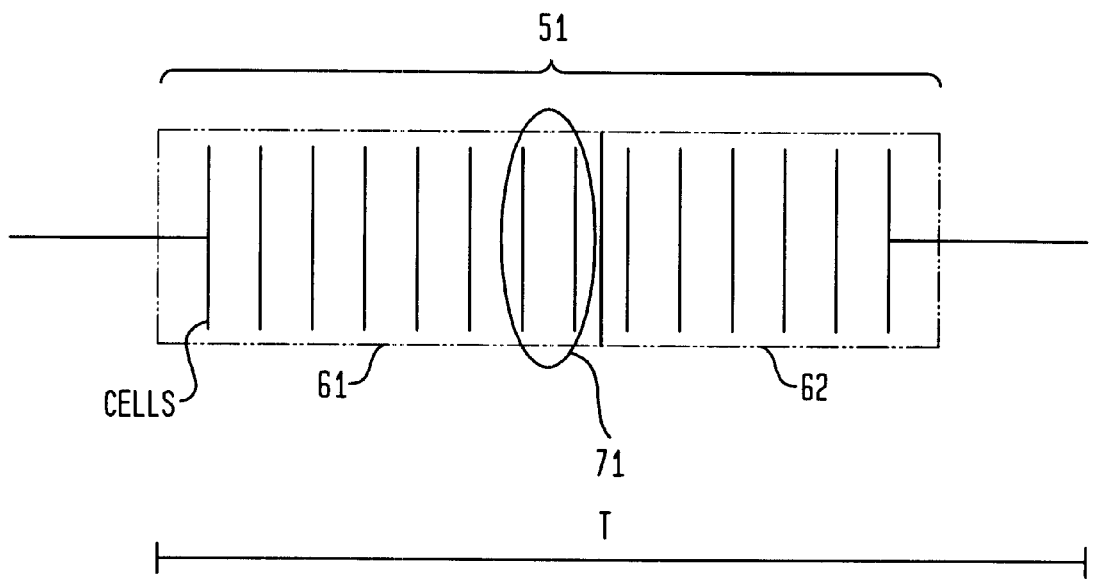
FIG. 1 shows an illustrative data stream for highlighting prior art conformance techniques.

Before describing the inventive concept, some additional background information on ATM and, in particular, GFR is provided.

The Guaranteed Frame Rate service (GFR)

As known in the art, an ATM user sends ATM cells either marked or unmarked. In particular, an ATM cell carries a single bit cell loss priority (CLP) indicator as part of the ATM cell header. An ATM cell is called marked, or unmarked, when the originator of the ATM cell has set its CLP bit set to one, or zero, respectively. A cell is called tagged when the network has set its CLP bit to one. A network may perform tagging only if tagging is allowed by the user. (Once in the network, the source of the setting of the CLP bit, i.e., whether marked by a user or tagged by a network element, cannot be determined.)

An unmarked cell identifies a cell of higher loss priority, that is, a cell with a higher QoS commitment, than a marked cell In a GFR service, network elements are aware of the loss priority indication conveyed in the CLP bit. Hence, marked cells are assumed to identify information of lesser importance to the user. If tagging is allowed by the user, a network is permitted to tag unmarked cells as determined by respective frame marking/tagging rule specified for the service (not described).

Users of the GFR service are required to send frames either marked or unmarked. However, frame marking, itself, has a number of variations. For example, homogeneous frame marking may be used in which an unmarked frame is defined as comprising all unmarked cells and a marked frame comprises all marked cells. Unfortunately, homogeneous frame marking cannot be assumed at all standardized interfaces for various practical reasons: i) the user may have failed to mark the frame in an homogeneous fashion, ii) frame delineation between a marked and an unmarked frame may have been lost at some point of the connection, iii) when tagging is allowed, a network element may not be able to tag all the cells of a frame unless the cells are all accumulated prior to their forwarding across the standardized interface, which is not currently required in ATM equipment. Therefore, any classification of user-generated frames in terms of homogeneously marked/unmarked frames would be incomplete.

As such, there are other variations to the meaning of a marked/unmarked frame. For example, an unmarked frame comprises only unmarked cells but a marked frame is one in which there is at least one marked cell Alternatively, the marking status of the frame may be determined by the marking status of the first cell of the frame. This alternative definition has the added value in that a) the marking status of a frame is determined at the beginning of the frame, which simplifies the implementation of network policing functions, and b) makes it easier for a network to enforce marking rules such that only unmarked cells qualify for any QoS commitments. For instance, a network may also be allowed to tag unmarked cells from inhomogeneously marked/tagged frames. This network behavior could even be allowed when tagging is not allowed by the user. Thus, it is possible to define at least two version of the GFR service, based on whether the user allows a network to tag unmarked frames.

The QoS commitment applies only to cells from unmarked frames conforming to the GFR traffic descriptor. The conformance definition, or algorithm, identifies frames from the incoming user generated cell stream that qualify for the QoS commitments offered by the GFR service. There are three conformance tests, that cells must pass to qualify for QoS commitments. The relevant tests are: i) maximum frame size (MFS) conformance, ii) peak cell rate (PCR) conformance, and iii) maximum burst size/minimum cell rate (MBS/MCR) conformance. Note that the maximum burst size/minimum cell rate test is in fact a single test for the two traffic parameters.

It is also possible to define a version of the GFR service that is not CLP-bit aware. In such a case, the QoS commitment applies to all user generated cells conforming to the GFR traffic descriptor that does not depend on the CLP bit.

Frame-Based Conformance Definition

Figure 2:
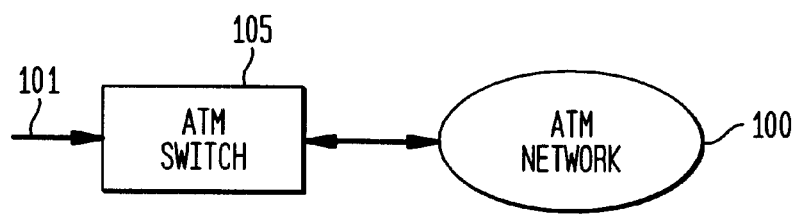
FIG. 2 shows an illustrative portion of a network providing a GFR service in accordance with the principles of the invention.

Reference should now be made to FIG. 2. Other than the inventive concept, the elements shown in FIG. 2 are well-known and will not be described in detail. For example, although shown as a single block element, ATM switch 105 includes stored-program-control processors, memory, and appropriate interface cards. In FIG. 2, an ATM network element, i.e., an ATM switch 105, receives a user data stream 101. The latter is further partitioned into frames, that are further made up of ATM cells. Although it is not necessary to the inventive concept, for the purposes of this description it is assumed that the related ATM service is in accordance with ATM Adaptation Layer (AAL) 5 as known in the art. For simplicity it is assumed that the user data stream 101 is associated with a particular user and other sources of traffic (from other users) received by ATM switch 105 are not shown. ATM switch 105 is a gateway element for transmission of data via ATM network 100, as known in the art, and provides a GFR service to the user. (Although the GFR service is still in the proposal stage, for the purposes of this description it is only important that ATM switch 105 receive a data stream representing a sequence of frames, each frame comprising a plurality of ATM cells, where the delineation of the frame utilizes the UUI bit of AAL5.)

For each user, or source of the data stream, there is a predefined traffic set as known in the art. Illustratively, this traffic set includes a set of parameters such as (but not limited to): PCR, MCR, MBS, MFS, $\tau_{PCR}$, $\tau'_{MCR}$. (The cell delay variation for the PCR and MCR are stored in $\tau_{PCR}$, and $\tau'_{MCR}$, respectively. Also, The values for each user's traffic set are presumed to be stored within ATM switch 105.) In accordance with the inventive concept, ATM switch 105 evaluates user data stream 101 for conformance to the user's traffic set at every frame boundary (described further below). If a particular frame is non-conforming, the next (future) frame is evaluated only on the basis of the traffic characteristics of that future frame and prior conforming frames. That is, unlike the above-described prior art technique, past non-conforming user generated traffic is not used to determine any QoS commitments to future user generated traffic. As a result, such a conformance definition for a GFR service delivers a low cell loss commitment only to cells from complete frames conforming to the GFR traffic set. It is presumed that ATM switch 105 is suitably programmed to carry out the below-described methods using conventional programming techniques, which, as such, will not be described herein.

In accordance with the inventive concept, conformance definitions are provided below for three variations of the GFR service. For the first version, to be referred to as the GFR0 service, the QoS commitment is independent of the CLP bit status. For the second version, to be referred to as GFR1, the QoS commitment applies to conforming unmarked cells. No cell tagging is allowed in this service. For the third version, to be referred to as GFR2, the QoS commitment also applies to conforming unmarked cells and cell tagging is allowed. For the CLP aware versions of the service, marked cells are expected to indicate cells with lower importance to the user, and hence, qualifying for a degraded cell loss commitment, if any.

Before describing the flow charts of FIGS. 3–8, the following definitions should be noted. It is assumed frame boundaries are indicated by use of the above-mentioned User-to-User Indication (UUI) bit in AAL5. The variables $T_{PCR}$ and $T_{MCR}$ are respectively the inverse of the PCR and MCR and are calculated as known in the art. For the combined MCR/MBS test a new cell delay variation tolerance, $\tau_{MCR}$, is computed as:

$$\tau_{MCR} = (MBS-MFS-1)(T_{MCR}-T_{PCR})+\tau_{MCR}.$$

Other supplemental variables are incorporated to keep track of the state of the relevant tests. These are:

Frame Loss Priority (FLP): FLP=1 indicates a marked/tagged frame; and FLP=0 indicates an unmarked/untagged frame;

New Frame (NeF): New frame indicator;

Non-Conforming Frame (NCF): Non-conforming frame indicator;

End of Frame (EOF): End of Frame indicator; and

Cnt: the size of the current frame in cells.

Figure 5:
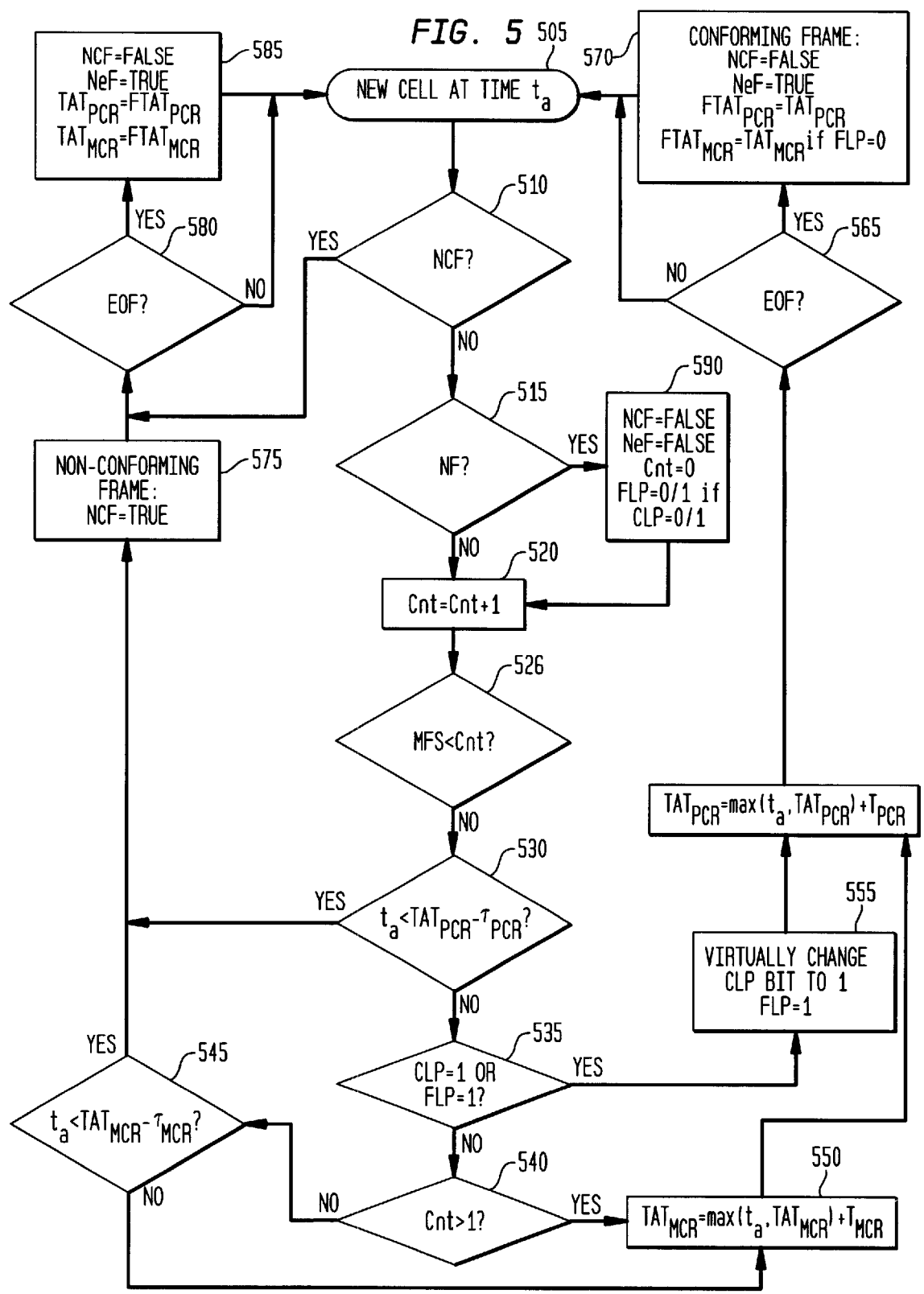
Figure 6:
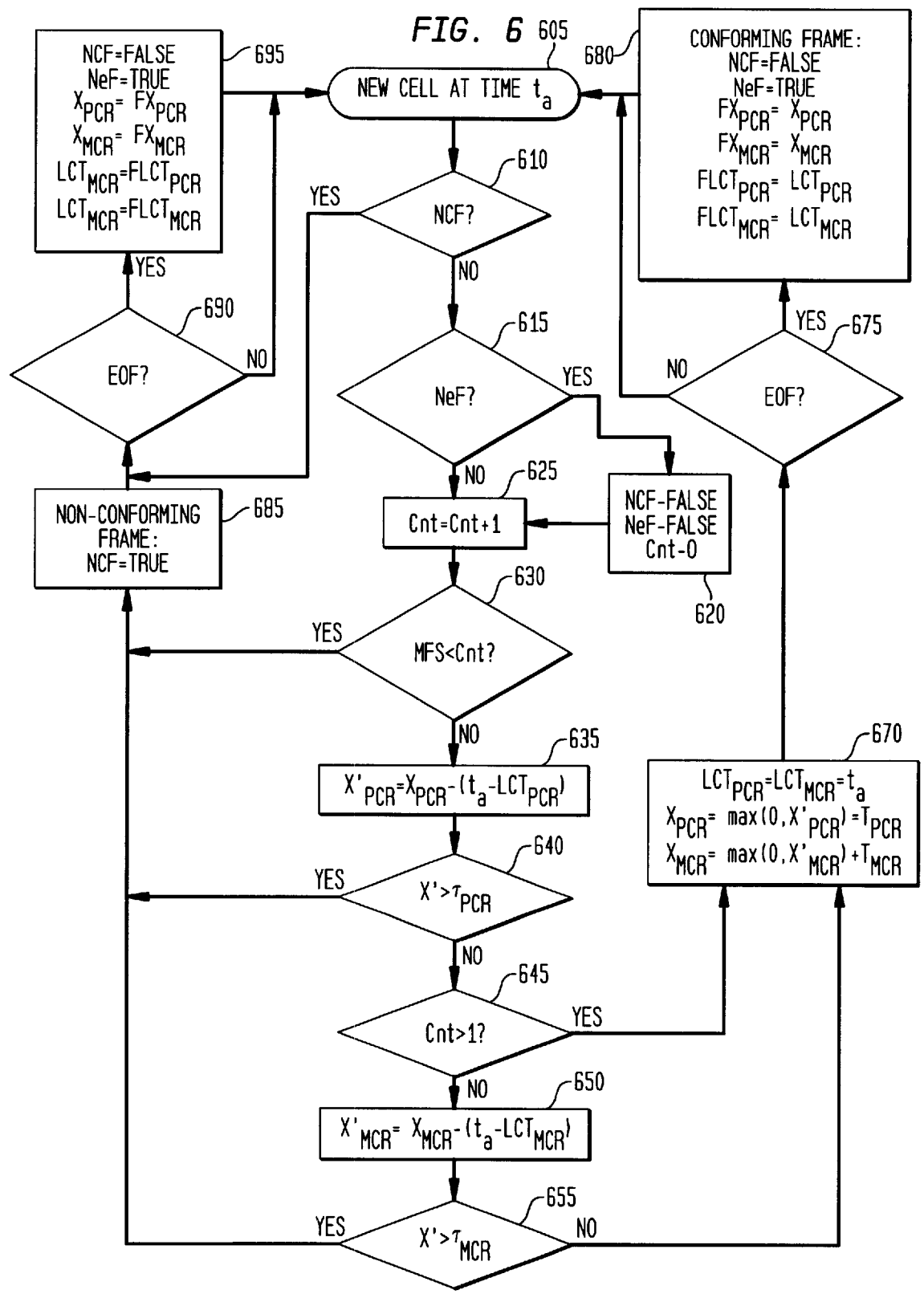
Figure 7:
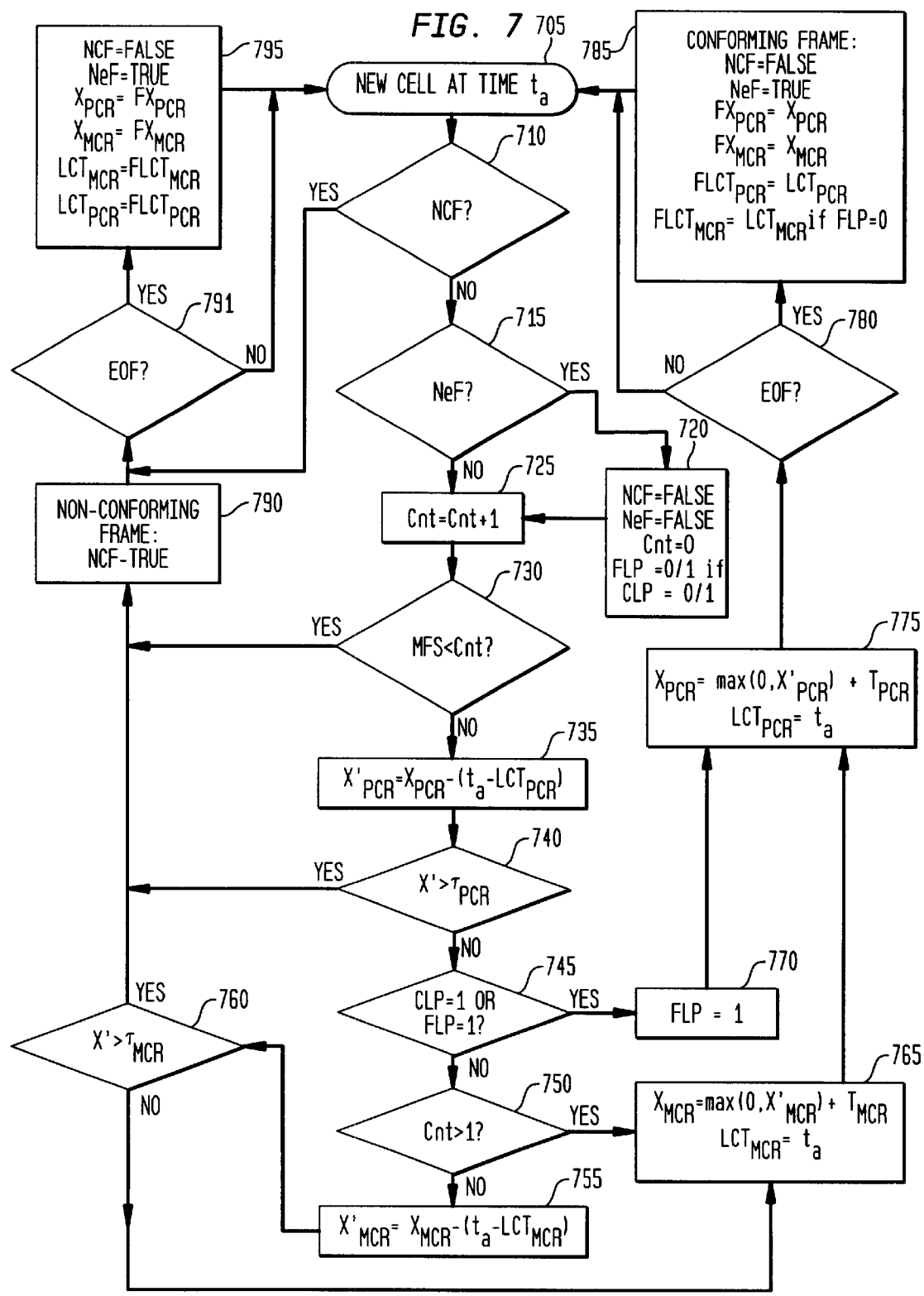
Figure 8:
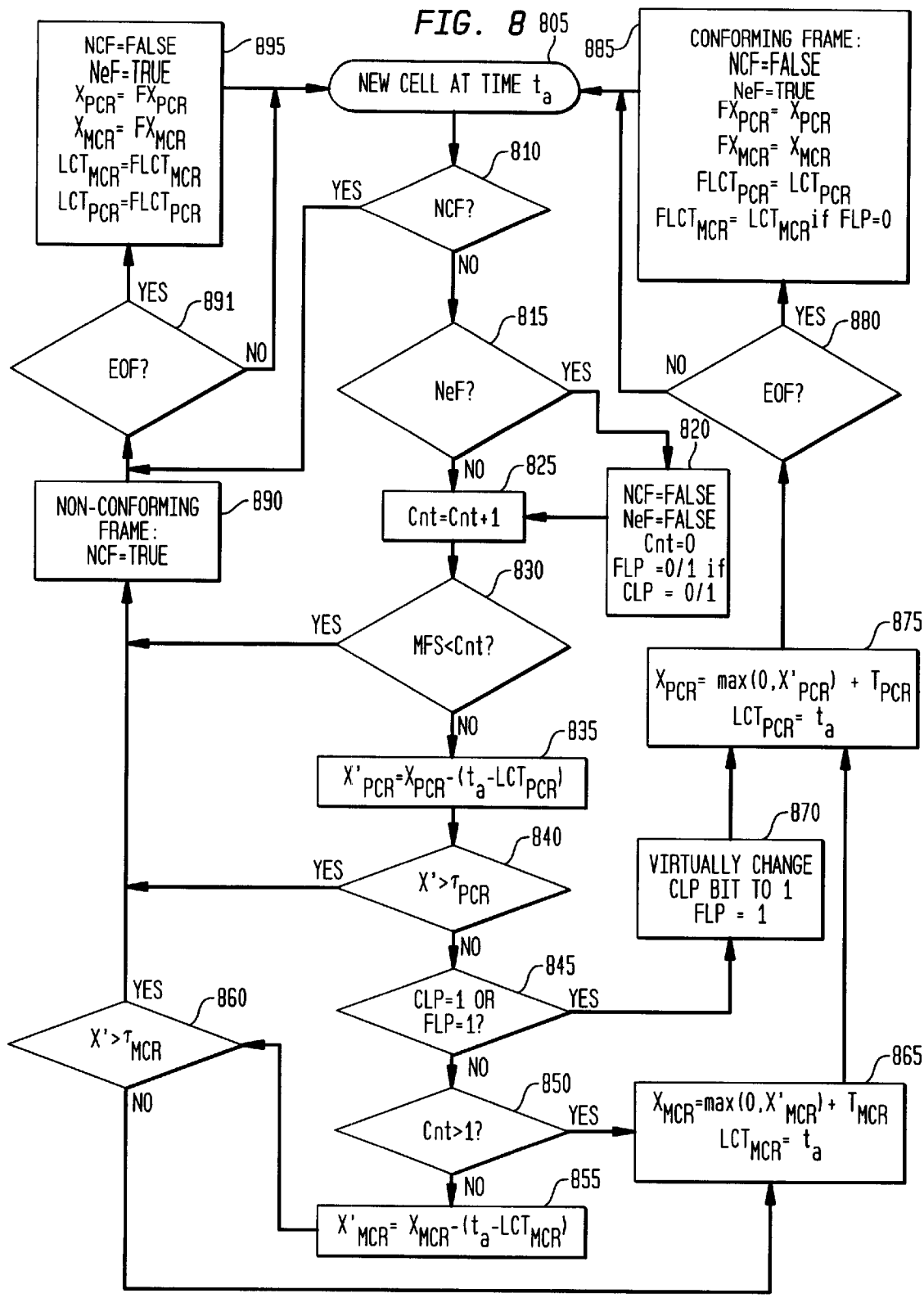

The conformance algorithms for the three versions of the GFR service are provided both in terms of a frame-based virtual-scheduling algorithm (FIGS. 3, 4, and 5, for GFR0, GFR1, and GFR2, respectively) and a frame-based continuous-state leaky bucket, or virtual buffering, algorithm (FIGS. 6, 7, and 8, for GFR0, GFR1, and GFR2, respectively).

As described further below, the virtual scheduling algorithm illustrated in FIGS. 3, 4, and 5, tracks the theoretical arrival times for relevant cell/frame events. These flow charts assume an unmarked (or FLP=0) frame is defined as having all its constituent cells unmarked and a marked/tagged framed (FLP=1) is defined as having at least one marked/tagged cell In the traditional cell-based version of a virtual scheduling algorithm the theoretical arrival times for cells from the same frame conforming to the PCR traffic descriptor are updated in the variable ($TAT_{PCR}$). The theoretical arrival times for cells from the same frame conforming to the MBS/MCR traffic descriptor are updated in the variable ($TAT_{MCR}$). These variables are used to maintain the current status of potentially (but not yet) conforming frames. In accordance with the inventive concept, two new variables, ($FTAT_{PCR}$) and ($FTAT_{MCR}$), are used to keep track of the valid theoretical arrival times for conforming frames. These new variables are updated only at the end of the frame, at which time cell conformance to all relevant tests for a frame is completely determined. The variables $TAT_{PCR}$, $TAT_{MCR}$, $FTAT_{PCR}$, and $FTAT_{MCR}$, are initialized with the time of arrival of the first cell of the connection, $t_a^0$.

Figure 3:
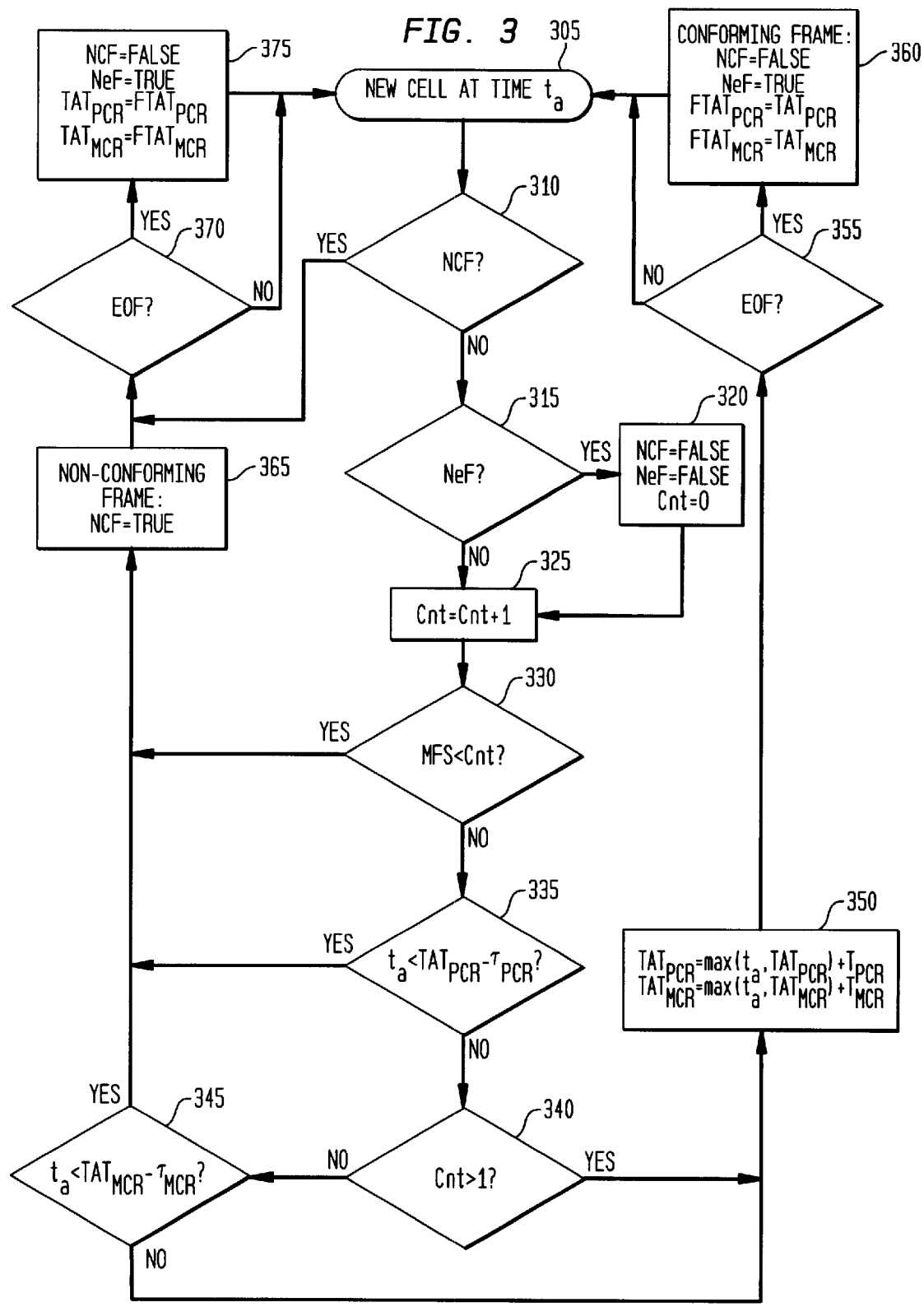
FIGS. 3–8 illustrative different flow charts embodying the principles of the invention for use in the network of FIG. 2.

Referring now to FIG. 3, an illustrative flow chart is shown for the GFR0 service in accordance with the principles of the invention. In step 305, a new cell from the received data stream arrives at time $t_a$. In step 310, a check is made of the value of the NCF variable. If this is a non-conforming frame, execution proceeds to step 370 (described below). If this is a conforming frame (at least for the moment), execution proceeds to step 315, which checks the value of the variable NeF. If this is a new frame, the variables NCF, NeF and Cnt are initialized as shown in step 320 and execution proceeds to step 325. If, in step 315, it is not a new frame, execution proceeds to step 325. In this latter step, the value of the Cnt variable is increased by one. In step 330, a comparison is made if the value of the Cnt variable is greater than the MFS. If the value of the Cnt variable is greater than the MFS, execution proceeds to step 365, where the frame is marked as a non-conforming frame and execution proceeds to step 370, described below. However, if the value of the Cnt variable is not greater than the MFS, execution proceeds to step 335.

In step 335, a comparison is made between the cell time and the value of the difference between theoretical arrival time for the PCR ($TAT_{PCR}$) and the cell delay variation for the PCR ($\tau_{PCR}$) (these variables were described above). If the value of the cell arrival time is less than this difference, execution proceeds to step 365, where the frame is marked as a non-conforming frame and execution proceeds to step 370, described below. If the value of the cell arrival time is not less than this difference, execution proceeds to step 340.

In step 340 a check is made if the value of Cnt is greater than 1. If the value of Cnt is greater than 1, execution proceeds to step 350, described below. If the value of Cnt is not greater than 1, execution proceeds to step 345. In the latter step, a comparison is made between the cell time and the value of the difference between theoretical arrival time for the MCR ($TAT_{MCR}$) and the cell delay variation for the MCR/MBS ($\tau_{MCR}$) (these variables were described above). If the value of the cell arrival time is less than this difference, execution proceeds to step 365, where the frame is marked as a non-conforming frame and execution proceeds to step 370, described below. If the value of the cell arrival time is not less than this difference, execution proceeds to step 350.

In step 350, the values for the variables $TAT_{PCR}$, and $TAT_{MCR}$ are updated as shown, where maxt$_a$, $TAT_{PCR}$) refers to the maximum value of either $t_a$ or $TAT_{PCR}$ (similarly with respect to max($t_a$, $TAT_{MCR}$)). Execution proceeds to step 355, where a check is made for the end of frame. If this is not the end of the frame, execution returns to step 305 for the next cell If this is the end of frame, it is a conforming frame and the variables NCF, NeF, $FTAT_{PCR}$ and $FTAT_{MCR}$ are updated as shown in step 360 and execution proceeds to step 305 for the next cell.

In step 370, a check is made of the value of the EOF variable. If this is not the end of the frame, execution returns to step 305. If this is the end of the frame (which in this case is non-conforming), the variables NCF, NeF, $TAT_{PCR}$ and $TAT_{MCR}$ are updated as shown in step 375. Execution then proceeds to back to step 305 to process the next cell.

In accordance with the principles of the invention, and as can be observed from the method of FIG. 3, the MFS conformance test (step 350), the PCR conformance test (step 335) and the maximum burst size/minimum cell rate (MBS/MCR) conformance test (step 345) are evaluated only as a function of the current frame and prior conforming frames. In particular, if a frame is conforming, the variables are updated as shown in step 360. However, if the frame is non-conforming, the variables are set to prior values based upon prior conforming frames, in step 375.

Figure 4:
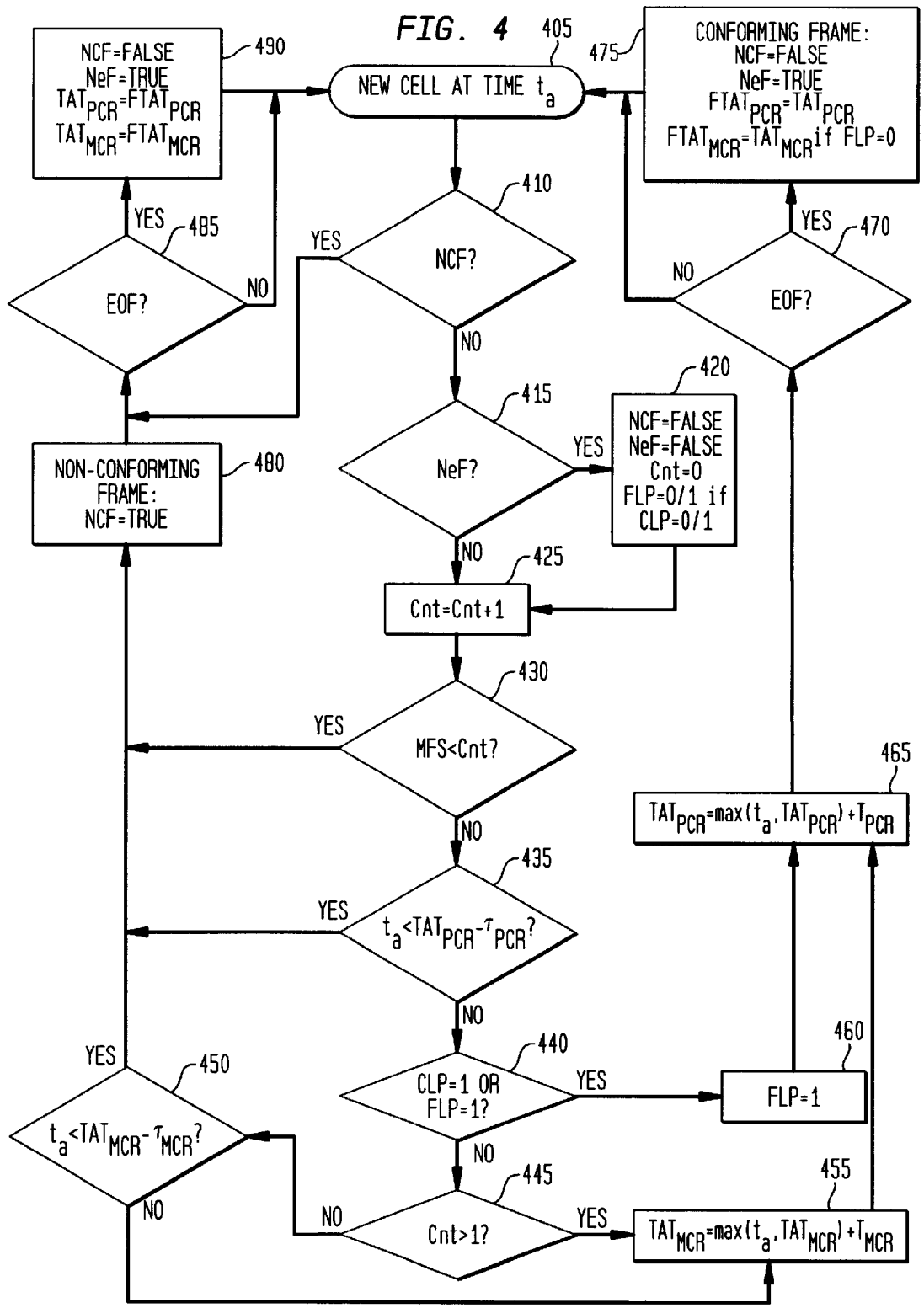

Referring now to FIG. 4, an illustrative flow chart is shown for the GFR1 service in accordance with the principles of the invention. In step 405, a new cell from the received data stream arrives at time $t_a$. In step 410, a check is made of the value of the NCF variable. If this is a non-conforming frame, execution proceeds to step 485 (described below). If this is a conforming frame (at least for the moment), execution proceeds to step 415, which checks the value of the variable NeF. If this is a new frame, the variables NCF, NeF, Cnt, and FLP are initialized as shown in step 420 and execution proceeds to step 425. If, in step 415, it is not a new frame, execution proceeds to step 425. In this latter step, the value of the Cnt variable is increased by one. In step 430, a comparison is made if the value of the Cnt variable is greater than the MFS. If the value of the Cnt variable is greater than the MFS, execution proceeds to step 480, where the frame is marked as a non-conforming frame and execution proceeds to step 485, described below. However, if the value of the Cnt variable is not greater than the MFS, execution proceeds to step 435.

In step 435, a comparison is made between the cell time and the value of the difference between theoretical arrival time for the PCR ($TAT_{PCR}$) and the cell delay variation for the PCR ($\tau_{PCR}$) (these variables were described above). If the value of the cell arrival time is less than this difference, execution proceeds to step 480, where the frame is marked as a non-conforming frame and execution proceeds to step 485, described below. If the value of the cell arrival time is not less than this difference, execution proceeds to step 440.

In step 440 a check is made if either CLP or FLP are set. If either are set, execution proceeds to step 460 where the variable FLP is set and then to step 465, described below. If neither CLP or FLP are set, execution proceeds to step 445, where a check is made if the value of Cnt is greater than 1. If the value of Cnt is greater than 1, execution proceeds to step 455, described below. If the value of Cnt is not greater than 1, execution proceeds to step 450. In the latter step, a comparison is made between the cell time and the value of the difference between theoretical arrival time for the MCR ($TAT_{MCR}$) and the cell delay variation for the MCR/MBS ($\tau_{MCR}$) (these variables were described above). If the value of the cell arrival time is less than this difference, execution proceeds to step 480, where the frame is marked as a non-conforming frame and execution proceeds to step 485, described below. If the value of the cell arrival time is not less than this difference, execution proceeds to step 455, where the value for the variable $TAT_{MCR}$ is updated as shown. Execution then proceeds to step 465, where the value for the variable $TAT_{PCR}$ is updated as shown.

After step 465, execution proceeds to step 470, where a check is made for the end of frame. If this is not the end of the frame, execution returns to step 405 for the next cell. If this is the end of frame, it is a conforming frame and the variables NCF, NeF, $FTAT_{PCR}$ and $FTAT_{MCR}$ are updated as shown in step 475 and execution proceeds to step 405 for the next cell.

In step 485, a check is made of the value of the EOF variable. If this is not the end of the frame, execution returns to step 405. If this is the end of the frame (which is a non-conforming frame, the variables NCF, NeF, $TAT_{PCR}$ and $TAT_{MCR}$ are updated as shown in step 490. Execution then proceeds to back to step 405 to process the next cell.

Referring now to FIG. 5, an illustrative flow chart is shown for the GFR2 service in accordance with the principles of the invention. This flow chart is similar to the flow chart of FIG. 4 and will not be described herein. It should be noted that in step 560, the CLP bit variable is virtually changed to one, in that the actual CLP bit of the frame is not set but the CLP variable for the program is set as if the frame was marked.

Turning now to FIGS. 6, 7, and 8, a continuous-state leaky bucket approach is illustrated. These FIGS. are similar in context to the ones described above with respect to FIGS. 3 and 4, and will not be described herein except as noted. This approach tracks a theoretical buffer content at the arrival time of the relevant cell/frame events (versus the elapsed time approach of FIGS. 3, 4, and 5). These flow charts assume an unmarked (or FLP=0) frame is defined as having all unmarked cells, and a marked/tagged framed (FLP=1) is defined as having at least one marked/tagged cell In the traditional cell-based version of a continuous-state leaky bucket algorithm the theoretical buffer content for cells from the same frame conforming to the PCR traffic descriptor are updated in the variable $X_{PCR}$, while the associated Last Conformance Time for such a cell is updated in the variable $LCT_{PCR}$. The theoretical buffer content for cells from the same frame conforming to the MCR/MBS traffic descriptors are updated in the variable $X_{MCR}$, while the associated Last Conformance Time for such a cell is updated in the variable $LCT_{MCR}$. Four new alternative variables, $FX_{PCR}$, $FLCT_{PCR}$, $FX_{MCR}$, and $FLCT_{MCR}$, are also provided in accordance with the principles of the invention. All buffer content variables are initially set to zero while all Last Conformance Time variables are initialized with the time of the arrival of the first cell of the connection, $t_a^0$.

It can be observed from the flow diagrams of FIGS. 3–8 that all state variables are properly initialized with the beginning of each frame, i.e., at frame boundaries, and all state variables properly reflect the results of the conformance tests at the end of the frame. Of course, these bookkeeping operations can be as well performed at the end of a frame. As a result, if a frame is declared as non-conforming, cells from that frame are not used to determine any QoS commitments to future user generated traffic.

It should be noted that changes to the flow charts of FIGS. 3–8 for alternative definitions of marked/tagged frames are straightforward and will not be described herein. For example, if the first cell of the frame is indicative of the marked/tagged status of the frame, the additional test for the CLP status as well as the new determination of the FLP status performed after the MCR and PCR tests would be removed from FIGS. 3–8.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of an ATM network, the inventive concept relates to quality of service (QoS) commitments in other types of networks.

What is claimed:

1. A method for use in a Guaranteed Frame Rate (GFR) service for testing for conformance, the method comprising the steps of:
   receiving a stream of data, the data representative a sequence of frames, the frames comprising a number of cells; and
   determining if each frame conforms to a predefined traffic set only as a function of cells within that frame and prior conforming frames and not including prior non-conforming claims.

2. The method of claim 1 wherein the predefined traffic set includes a maximum frame size in cells for each frame.

3. The method of claim 1 wherein the predefined traffic set includes a maximum burst size in cells.

4. The method of claim 1 wherein the determining step initializes a set of state variables at frame boundaries as a function of the cells in that frame and prior conforming frames and not including prior non-conforming claims.

5. The method of claim 1 wherein the determining step includes the step of determining if each frame conforms to a maximum burst size only as a function of cells within that frame and prior conforming frames and not including prior non-conforming claims.

6. The method of claim 1 wherein the determining step includes the steps of:

initializing a set of variables to initial values at the start of each frame;

updating values of the set of variables for each cell in each frame; and if at least one of the updated values of the set of variables does not conform to a predefined value, declaring that frame to be non-conforming.

7. A method for use in processing a stream of data representing a sequence of frames, the method comprising the steps of:

initializing a set of variables to initial values at frame boundaries, the frame boundary delineating a prior frame from a current frame;

updating values of the set of variables as a function of only data within the current frame and prior conforming frames and not including prior non-conforming claims; and if at least one of the updated values of the set of variables does not conform to a predefined value, declaring the current frame to be non-conforming.

8. The method of claim 7 wherein the predefined value is a member of a traffic descriptor associated with a source of the data stream.

9. The method of claim 8 wherein the predefined value is a maximum frame size in cells for each frame.

10. The method of claim 8 wherein the predefined value is a maximum burst size in cells.

\* \* \* \* \*